(12) United States Patent
Melbouci

(10) Patent No.: US 6,197,100 B1
(45) Date of Patent: Mar. 6, 2001

(54) DISPERSIBLE WATER SOLUBLE POLYMERS

(75) Inventor: Mohand Melbouci, AX Dordrecht (NL)

(73) Assignee: Hercules Incorporated, Wilmington, DE (US)

(*) Notice: Subject to any disclaimer, the term of this patent is extended or adjusted under 35 U.S.C. 154(b) by 0 days.

(21) Appl. No.: 09/209,372

(22) Filed: Dec. 4, 1998

(51) Int. Cl.$^7$ .................................................. C09D 101/28
(52) U.S. Cl. ................................ 106/174.1; 106/184.3; 106/186.1
(58) Field of Search ............................ 106/184.3, 174.1, 106/186.1

(56) References Cited

U.S. PATENT DOCUMENTS

| | | | |
|---|---|---|---|
| 2,647,064 | 7/1953 | Anderson et al. | 106/179 |
| 3,485,651 | 12/1969 | Ganz | 106/179 |
| 3,489,719 | 1/1970 | Savage et al. | 260/73 |
| 3,960,584 | 6/1976 | Savage | 106/178 |
| 4,218,262 | 8/1980 | Warren | 106/206 |
| 4,325,861 | 4/1982 | Braun et al. | 523/205 |
| 4,654,086 | 3/1987 | Baird et al. | 106/206 |
| 4,720,303 | 1/1988 | Soldatos | 106/181 |
| 4,735,659 | 4/1988 | Bishop | 106/193 R |
| 5,003,060 | 3/1991 | Vinot | 536/114 |
| 5,032,659 | * 7/1991 | Heidel | 527/300 |
| 5,278,203 | 1/1994 | Harms | 523/200 |
| 5,391,359 | 2/1995 | Patel | 427/180 |
| 5,633,028 | 5/1997 | Wong | 426/99 |
| 5,637,635 | 6/1997 | Patel | 524/400 |
| 5,718,969 | 2/1998 | Sewall et al. | 428/304.4 |
| 6,008,172 | * 12/1999 | Broshi et al. | 510/135 |

FOREIGN PATENT DOCUMENTS

| | | |
|---|---|---|
| 0658596A2 | 6/1995 | (EP) . |
| 52-002870 | 1/1977 | (JP) . |

OTHER PUBLICATIONS

CA AN 84:35253, Urzhenko, Evaluation of the stabilizing ability. . ., 1972.*

CA AN 107: 156547, Dobashi, "Agents for prevention of adhesion. . .", Feb. 2, 1987.*

* cited by examiner

*Primary Examiner*—David Brunsman
(74) *Attorney, Agent, or Firm*—Martin F. Sloan

(57) ABSTRACT

Composition comprising water soluble polymer, such as cellulose ethers, guar, or derivatives thereof and surfactant, such as sorbitan esters, improves dispersibility of polymer in aqueous media.

8 Claims, No Drawings

DISPERSIBLE WATER SOLUBLE POLYMERS

BACKGROUND OF THE INVENTION

1. Field of the Invention

This invention relates to a composition water soluble polymers and surfactants and more particularly it relates to a composition comprising cellulose ethers, guar, or derivatives thereof and sorbitan esters, such compositions having improved dispersibility in water.

2. Description of the Prior Art

Water soluble polymers are used widely to prepare a variety of aqueous solutions among which cellulose ethers (CES), or guar, or derivatives thereof find wide application as thickening and suspending agents.

In the preparation process of aqueous systems, incorporation of water soluble cellulose ethers or cellulose ether derivatives into the composition often present difficulties because of the tendency for lump formation when the polymers are added. In fact, in contact with water, local gel formation can occur around particles of undissolved cellulose ether, which prevent the hydration of the polymer matrix. The disaggregation/dissolution of the agglomerates or lumps when formed is very time consuming. Consequently, there is a need for method of incorporating CEs and CE derivatives which lead to improved polymer dispersion and rapid viscosity development and which allow convenient handling of the polymer.

To overcome the lumping problems, various types of approaches have been attempted. These include coating the particles with glyoxal, processing with larger particles, granulated CEs, blending the CEs with fatty acid salts, surfactants and/or silica, suspending the CEs in non solvent medium (Fluid Polymer Suspensions: FPSs). However, these treatments exhibit use limitations in some applications. For instance, glyoxal treated CEs show poor dispersibility in an alkaline environment (such as drilling muds); larger particles avoid the lumping problems but they require longer dissolving time; liquid compositions have the disadvantage of relatively low solids content resulting in high cost and blend of CEs and other ingredients present the disadvantage of reduced active polymer content; etc.

U.S. Pat. No. 5,391,359 describes water dispersible thickeners comprising hydrophilic polymers coated with particulate fatty acids or the salts thereof. The composition is a blend of CE (CMC), starches and gums with finely divided particulate dispersant (more preferably from 2% to 20%) such as fatty acid or fatty acid salts (Al, Ca, Mg & Na stereate). Hydrophobic fumed silica was used for comparative purposes.

E.P. Patent 0 658 596 discloses a fast hydration biopolymers composition that contains a composition of biopolymers and surfactants at ratios varying from 0.1% to 1.5% total wt. The composition is said to be non-dusting and to have fast hydration time. The composition is said to be useful as suspending agent in industrial formulations, cosmetics, food and pharmaceuticals.

U.S. Pat. No. 5,003,060 teaches preparation of solid, free flowing and nondusting granules of polysaccharides of microbial origin, e.g. xanthan gum, by granulating the powder in a fluidized bed. Such granules may contain at least one wetting agent (0.5–10% w/w, including polyethoxylated sorbitan esters) or combination thereof and have a particle size varying from 0.5 mm to 2.0 mm and apparent density below 0.7. The granules are said to contain only small amount of anti-agglomerating additive and disperse instantaneously in water with rapid dissolution and are used as thickeners e.g. for drilling in petroleum recovery.

U.S. Pat. No. 4,720,303 describes the manufacture of thickening agent, comprising a mixture of a CE and solid acid, suitable for thickening carpet backing formulations, paints and drilling muds. The thickening agent can be used to thicken in acid, neutral and/or alkaline media. It is also disclosed that the thickening agent can easily be dispersed without lump formation.

U.S. Pat. No. 4,735,659 discloses a process for preparing water dispersible compositions containing hydrophobic silica to prevent agglomeration of initial wetting of CEs, gums, starches, vinyl polymers, acrylic polymers and biopolysaccharides. It is disclosed that water soluble high Mw polymer is contacted with hydrophobic fumed silica in such manner that the individual particles are coated with hydrophobic fumed silica. The resulting composition is disclosed to readily dissolve in water producing a translucent solution; if clear aqueous solution is desired, a surfactant can optionally be added. A composition of CMC and CMHEC mixed with 2% hydrophobic fumed silica were used for comparative purposes.

U.S. Pat. No. 4,654,086 discloses composition and preparation of dispersible xanthan gum obtained by treatment with surfactant which is a food approved wetting agent e.g. lecithin, sorbitan esters, etc. The xanthan/surfactant blends w/w ratio is disclosed to vary from 95/5 to 80/20. Liquid surfactants can be added directly to xanthan gum powder to uniformly coat the particles.

U.S. Pat. No. 4,218,262 describes a nonclumping, delayed action viscosity increasing agent comprising core particles of xanthan gum and an encapsulating coating of a fat derivative and a surfactant wherein the coating has a hydrophilic/lipophilic balance (HLB) of from 3.5 to 10. The fat derivative is selected from the group consisting of fatty acids and mono and diglycerides of fatty acids. The surfactant is selected from the group consisting of alkali metal salts of fatty acids. Methods of forming the encapsulated particles are also disclosed.

U.S. Pat. No. 3,960,584 relates to a composition of matter consisting of finely divided, high Mw, water soluble polymeric material in intimate mixture with other components (from 1 to 4) and a process for the preparation thereof. The water soluble polymeric material is selected from the group consisting of acrylics, natural gums, CEs and CE derivatives. The other components are disclosed to be polyglycols, and anionic and non-ionic surfactants. The invention composition is disclosed to disperse and dissolve quickly in aqueous media without skinning and agglomeration. The polymeric material is disclosed to be useful as a flocculent and thickener in many industrial processes.

None of the aforementioned references discloses a composition comprising cellulose ethers, or guar, or derivative thereof and sorbitan esters.

SUMMARY OF THE INVENTION

According to the present invention there is provided a composition comprising (a) at least one water soluble polymer selected from the group consisting of cellulose ethers, guar or derivatives of either one and (b) at least one surfactant selected from the group consisting of sorbitan esters, ethoxylated sorbitan esters and cationic surfactant selected from the group consisting of quaternary ammonium salts.

Further according to the present invention there is provided a process for improving the dispersibility of water soluble polymers selected from the group consisting of cellulose ethers, guar or derivatives thereof comprising (a) providing surfactant selected from the group consisting of sorbitan esters, ethoxylated sorbitan esters and cationic surfactant selected from the group consisting of quaternary ammonium salts, and (b) contacting the surfactant with the water soluble polymer.

DETAILED DESCRIPTION OF THE INVENTION

It has been discovered that certain water soluble polymers (WSPs) can be made readily dispersible in water with certain surfactants. The water soluble polymers can be cellulose ethers, or guar, or derivatives thereof. The resulting polymeric material made using the wet treatment process is non-dusting and has better dispersibility and faster hydration time compared to non-treated material. The composition is useful as thickener and suspending agent for industrial, food and cosmetic applications.

The most commonly used cellulose ethers or cellulose ether derivatives are carboxymethyl cellulose (CMC), hydroxyethyl cellulose (HEC), carboxymethylhydroxyethyl cellulose (CMHEC), ethyl hydroxyethyl cellulose (EHEC), methylcellulose (MC), hydroxpropyl cellulose (HPC), methylhydroxyethyl cellulose (MHEC) ethyl guar and methylhydroxypropyl cellulose (MHPC). Preferred WSPs are CMC, HEC, CMHEC, MC, and guar, cationic guar, carboxymethyl guar, hydroxypropyl guar, carboxymethyl hydroxypropyl guar and the most preferred WSPs are CMC, HEC and CMHEC.

The use of the water soluble polymeric composition of the present invention in a variety of aqueous media provides a substantial advantage over the use of non-treated polymer, because it reduces the tendency of lumping and slow dispersion/dissolution.

It has been found that coating cellulose ethers, or guar, or derivatives thereof with surfactants, e.g. PolyOxyEthylene Sorbitan MonoStereate (POESMS) at extremely low proportions gives a good initial hydration of the resulting powder in contact with water. In fact, the surfactant serves to increase the solubility of the polymer and to promote wetting of the coated particles when dispersed in aqueous medium, leading to reduced fish eyes formation and to rapid viscosity build up.

In accordance with the present invention, a water dispersible CMC (Blanose® CMC, available from Hercules Incorporated), polyanionic cellulose, PAC (AquaPAC® polyanionic cellulose, available from Aqualon Oil Field Chemicals) and cationic guar (de-boraxed N-Hance®3000 guar available from Hercules Incorporated) have been discovered to have significant dispersibility improvement in various types of aqueous media (acid, neutral or alkaline), when treated with surfactants of the present invention.

The composition of the present invention comprises water soluble cellulose ethers, or guar, or derivatives of any of these polymers treated with surfactants. The water soluble polymers are in the form of finely divided solids. Preferably, the particle size distribution is such that about 95% by weight of the particles have a size less than about 425 microns. More preferably, the particle size distribution is such that the particles have a size greater than about 150 microns and less than about 425 microns.

Both technical grade and purified grade of cellulose ethers, or guar, or derivatives thereof may be used in the scope of this invention.

The surfactant incorporated in the composition of this invention serves as a wetting and dispersing agent to improve the initial hydration of the coated water soluble polymers, leading to a reduced fish eyes formation and to rapid viscosity build up, resulting from enhanced polymers solubility in various aqueous mediums.

Generally, the surfactant is selected from the group consisting of sorbitan esters, ethoxylated sorbitan esters such as polyethoxyethylene sorbitan esters, and cationic surfactants selected from the group consisting of quaternary ammonium salts. Preferably, the surfactant is selected from the group consisting of polyethoxyethylene sorbitan esters and methylammonium chlorides.

Most preferred surfactant is polyethoxyethylene sorbitan monostereate, known as POESMS or polysorbate 60 and monomethylammonium chlorides, such as tricetyl ammonium chloride.

In the composition of the present invention, it is preferred that water soluble polymers be present at a minimum level of about 98% based on total weight of treated polymeric material. More preferably the minimum level is about 99% and most preferably about 99.5%. It is preferable that the maximum level of water soluble polymers is about 99.9%, more preferably about 99.85% and most preferably about 99.8%.

Preferably, the maximum level of surfactant used in this invention is about 2% by weight based on total weight of treated polymeric material. More preferably the maximum level is about 1%, and most preferably about 0.5%. A preferred minimum level of surfactant is about 0.1%, more preferred about 0.15% and most preferred about 0.2%. The level of surfactant that is chosen for use in this invention depends on the particular balance of dry flow properties and dispersion that is desired. At lower surfactant levels, i.e. 0.1% and/or 0.15%, the dry flow properties of the treated material are achieved, but the dispersion properties are not as good as that achieved at higher levels, i.e. 0.5% or higher. At higher surfactant levels, i.e. 0.5% or higher, caking tendency of the resulting treated polymeric material was observed. A good compromise of dry fluidity and dispersion properties has been achieved at intermediate levels of about 0.25 wt. %.

In addition the composition of this invention can contain glyoxal in an amount sufficient to provide a slight delay of polymer particles hydration. Preferably, the maximum level of glyoxal used in this invention is about 2% by weight based on total weight of treated polymeric material. More preferably the maximum level is about 1% and most preferably about 0.3%. A preferred minimum level of glyoxal is about 0.01%, more preferably about 0.05 and most preferably about 0.20%. The most preferred composition will contain about 99.7% water soluble polymer, about 0.25% surfactant and about 0.05% glyoxal.

The process for improving the dispersibility of water soluble polymers selected from the group consisting of cellulose ethers, guar or derivatives thereof comprises:

a) providing surfactant selected from the group consisting of sorbitan esters, ethoxylated sorbitan esters and cationic surfactant selected from the group consisting of quartenary ammonium salts, and b) contacting the surfactant with the water soluble polymer.

This method can be carried out by: a) dissolving a surfactant, and optionally glyoxal, in an organic solvent (e.g. acetone, methanol); b) contacting the dissolved surfactant with the cellulose ether, or guar, or derivative thereof to form a mixture; c) drying the mixture; and d) if necessary grinding the mixture.

In the process for preparing the composition of this invention, the first step is the preparation of the surfactant solution. In the preparation of this solution, the surfactant is added into the organic solvent and mixed with magnetic stirrer until a complete dissolution of the surfactant. To speed up the dissolution of the surfactant, heat can be applied while stirring (the surfactant may be solid below 20° C.).

The contacting step can be performed by a number of techniques, it can either be performed by spraying the dissolved surfactant onto the cellulose ether, or guar, or derivative thereof to achieve contacting or by slurrying the mixture for a sufficient time to achieve intimate contacting. To ensure homogeneous coating of polymeric particles, the most preferred contacting technique consists of slurrying dry polymers in the surfactant solution until the particles are wetted out and then drying the mixture. Glyoxal may be added into the surfactant solution before contacting the polymer. The most preferred organic solvents are acetone and methanol.

Contacting the water soluble polymer and surfactant can also be carried out by dry blending and grinding when the surfactant is in a powder form. This approach is particularly suitable for cationic surfactant, e.g. tricetyl ammonium chloride. The water soluble polymer is contacted with the dry surfactant in such manner that the individual polymer particles are coated with surfactant. To achieve intimate contact between the polymer and surfactant particles, the dry blend can slightly be ground to increase their contact surface. Preferably, the maximum level of dry surfactant used in this invention is about 2% by weight based on total weight of treated polymeric material. More preferably the maximum level is about 1% and most preferably about 0.75%. A preferred minimum level of dry surfactant is about 0.1%, more preferably about 0.5% and most preferably about 0.75%. Glyoxal may be added onto the water soluble polymer (slurried in organic solvent or sprayed onto the polymer as an aqueous solution) and then drying the mixture. The dried mixture is then contacted with the dry surfactant and ground to achieve intimate contacting. The most preferred composition will contain about 99.2% water soluble polymer, about 0.75% surrfactant and about 0.05% glyoxal.

This invention is illustrated by the following examples, which are for illustration only and are not intended to be limiting. All parts and percentages are by weight unless otherwise indicated.

EXAMPLES 1–4

These examples illustrate the preparation of the composition of the present invention utilizing premium quality grade AquaPAC® polyanionic cellulose, (available from Aqualon Oil Filled Chemicals, Houston, Tex.), carboxymethyl cellulose (Blanose® refined CMCs 9H4, 7M and 7L, available from Hercules Incorporated, Wilmington, Del.), cationic guar (N-Hance 3000® guar, available from Hercules Incorporated), six sorbitan and ethoxylated sorbitan ester surfactants (Montane 85, Montanox 20, 60, 80 and 85, available from Seppic, Paris, France and Tween 60, available from ICI, Assen, Germany), and Tricetylammonium chloride (Varisoft TC90, available from Sherex Chemical Company, Dublin, Ireland).

The appropriate amount of sorbitan ester and ethoxylated sorbitan ester surfactants was gently dissolved in acetone using a magnetic stirrer. Heat was applied to speed up the dissolution of surfactant, if necessary.

When using the slurrying technique, the appropriate amount of water soluble polymer was added into the surfactant solution at equal ratio (1:1, corresponding to a wet cake of about 50% solids). The resulting mixture was stirred for sufficient time to achieve intimate contacting. The mixture was then dried at a temperature of 60° C.

When using the spraying technique, the surfactant solution was sprayed onto dry particles of water soluble polymer while mixing with Hobbart mixer. The resulting mixture was stirred for sufficient time to achieve intimate contacting. The mixture was then dried at a temperature of 60° C.

When using the blending technique, the dry surfactant was mixed with the dry water soluble polymer. The resulting mixture was ground with a "coffee-mill" for sufficient time to achieve intimate contacting.

The compositions of these examples are summarized in Tables 1 to 4.

TABLE 1

Dispersible AquaPAC.Reg Compositions

| Ingredients | Ex. 1-a % | Ex. 1-b % | Ex. 1-c % | Ex. 1-d % | Ex. 1-e % | Ex. 1-f % | Ex. 1-g % | Ex. 1-h % | Ex. 1-i % | Ex. 1-j % | Ex. 1-k % |
|---|---|---|---|---|---|---|---|---|---|---|---|
| AquaPAC.Reg[1] | 99.8 | 99.75 | 99.8 | 99.75 | 99.75 | 99.75 | 99.75 | 99.70 | 99.00 | 99.95 | 99.80 |
| Tween 60 | 0.20 | 0.25 | | | | | | | | | |
| Montane 85 | | | 0.20 | 0.25 | | | | | | | |
| Montanox 20 | | | | | 0.25 | | | | | | |
| Montanox 60 | | | | | | 0.25 | | 0.25 | | | |
| Montanox 85 | | | | | | | 0.25 | | | | |
| Glyoxal | | | | | | | | 0.05 | | 0.05 | 0.05 |
| Varisoft TC 90 | | | | | | | | | 1.00 | | 0.75 |

[1]AquaPAC.Reg is a regular (High viscosity) premium quality grade polyanionic cellulose available from Aqualon Oil Field Chemicals, Houston, Texas. AquaPAC.Reg is an effective additive for viscosity and filtration control aid for many water based drilling fluids.

TABLE 2

Dispersible AquaPAC.LV Compositions

| Ingredients | Ex. 2-a % | Ex. 2-b % | Ex. 2-c % | Ex. 2-d % | Ex. 2-e % | Ex. 2-f % | Ex. 2-g % | Ex. 2-h % | Ex. 2-i % | Ex. 2-j % | Ex. 2-k % |
|---|---|---|---|---|---|---|---|---|---|---|---|
| AquaPAC.LV[(1)] | 99.8 | 99.75 | 99.8 | 99.75 | 99.75 | 99.75 | 99.75 | 99.75 | 99.00 | 99.95 | 99.80 |
| Tween 60 | 0.20 | 0.25 | | | | | | | | | |
| Montane 85 | | | 0.20 | 0.25 | | | | | | | |
| Montanox 20 | | | | | 0.25 | | | | | | |
| Montanox 60 | | | | | | 0.25 | | | | | |
| Montanox 80 | | | | | | | 0.25 | | | | |
| Montanox 85 | | | | | | | | 0.25 | | | |
| Varisoft TC 90 | | | | | | | | | 1.00 | | 0.75 |
| Glyoxal | | | | | | | | | | 0.05 | 0.05 |

[(1)]AquaPAC.LV is a low viscosity premium quality grade polyanionic cellulose available from Aqualon Oil Field chemcials, houston, Texas. AquaPAC.LV is an effective additive for filtration control aid for solids laden water based drilling fluids without causing significant increase in viscosity and gel strengths.

TABLE 3

Dispersible CMC compositions

| Ingredients | Ex. 3-a | Ex. 3-b | Ex. 3-c | Ex. 3-d | Ex. 3-e | Ex. 3-f | Ex. 3-g |
|---|---|---|---|---|---|---|---|
| Blanose 7L[(1)] | 99.75% | 99.50% | 99.00% | | | | |
| Blanose 7M | | | | 99.50% | 99.00% | | |
| Blanose 9H4 | | | | | | 99.50% | 99.00% |
| Tween 60 | 0.25% | 0.50% | 1.00% | 0.50% | 1.00% | 0.50% | 1.00% |

[(1)]Blanose refined CMC (7L, 7M and 9H4) is a series of industrial grades of purified carboxymethylcellulose with a minimum purity of 98%. These samples have a degree of substitution (D.S.) of approximately 0.7 - commonly referred to as "7 type" - and a D.S. of approximately 0.90 - designated as "9 types" - with an average viscosity range in freshwater varying from about 40 mPa · s at 2% for "L" type, about 450 mPa · s at 2% for "M" type and about 3000 mPa · s at 1% for H4" type.

TABLE 4

Dispersible Cationic Guar

| Ingredients | Example 4 |
|---|---|
| N-Hance 3000 ® | 99.75% |
| Tween 60 | 0.25% |

N-Hance 3000® guar is a naturally derived cationic guar which imparts conditioning properties to shampoo and after shampoo hair care products. Being lightly crosslinked with boron, N-Hance 3000 guar requires addition of acidic solution (such as citric acid) to promotes its hydration. After fully hydrated, the polymer solution is then neutralized. This preparation process is rather critical with regard to pH adjustment of final hair products.

To evaluate the contribution of surfactant treatment on dispersibility of N-Hance 3000 guar, we proceeded as follow: a) Wash out the borax from the standard sample with acetone at least two times; b) Dissolve Tween 60 surfactant in acetone; c) Slurry the de-boraxed H-Hance 3000 guar for a sufficient time; and, d) dry the mixture. As with AquaPAC and CMC treated samples, the resulting surfactant treated N-Hance 3000 guar is not dusting and has a dissolution time of 25 minutes at pH 7. The sample does not have any delayed hydration time i.e. the polymer starts hydrating upon its addition into water. With the surfactant treatment, no more pH adjustment is required in the preparation process of the hair care products.

EXAMPLE 5

Applying the same treatment for other cellulosic derivatives, such as Hydroxyethylcellulose (HEC), Ethylhydroxyethylcellulose (EHEC), Carboxymethylhydroxyethyl cellulose (CMHEC), Methyl Cellulose (MC), Methylhydroxyethylcellulose (MHEC), Hydroxypropylcellulose (HPC), or Methylhydroxypropytlcellulose (MHPC) by adding about 0.25 wt. % of polyoxyethylene sorbitan mono stereate, would result in polymeric materials with better dispersibility than standard non treated materials.

EXAMPLE 6

Applying the same treatment for other guar products or guar derivatives, such as straight guar, Carboxymethyl Guar (CMG), Hydroxypropyl Guar (HPG), Ethyl Guar (EG) or Carboxymethylhydroxypropyl Guar (CMHPG) by adding about 0.25 wt. % of polyoxyethylene sorbitan mono stereate, would result in polymeric materials with better dispersibility than the nontreated materials.

EXAMPLE 7

Similarly to the wet coating process described in Example 1–4, applying the surfactant treatment by dry blending tricetylammonium chloride with other cellulosic derivatives, such as Hydroxyethylcellulose (HEC), EthylHydroxyethylcellulose (EHEC), Carboxymethylhydroxyethyl Cellulose (CMHEC), Methyl Cellulose (MC), Methylhydroxyethylcellulose (MHEC), Hydroxypropyl Cellulose (*HPC), or Methylhydroxypropylcellulose (MHPC), would result in polymeric materials with better dispersibility than standard non treatment materials.

EXAMPLE 8

Applying the same treatment as in Example 7 by dry blending tricetyl ammonium chloride with other guar products or guar derivatives, such as straight guar, Carboxymethyl Guar (CMG), Hydroxypropyl Guar (HPG), Ethyl Guar (EG) or Carboxymethylhydroxypropyl Guar (CMHPG), would result in polymeric materials with better dispersibility than the non treated materials.

EXAMPLE 9

When the water soluble polymers of Examples 7 and 8 are additionally treated with glyoxal before applying the dry process treatment, the resulting polymeric materials have better dispersibility than the non treated materials.

All compositions of the present invention were characterized by their dry flow properties and their performance in various aqueous media.

The performance of the resultant surfactant coated water soluble polymers have been evaluated in terms of dispersibility (hydration curves) and performance in various industrial applications.

Performance in Paper Coating Application

Surfactant treated Blanose refined CMC 7L of Examples 3-a to 3-c were evaluated in paper coatings application.

Table 5 illustrates the preparation of 5% stock solution of surfactant treated Blanose refined CMC 7L to check the effect of the treatment on final viscosity. The viscosity was checked at 25° C., Brookfield LVT, 30 rpm. The non-treated CMC sample was used as a reference.

TABLE 5

Brookfield viscosity of 5% solution, 25° C., 30 rpm

| CMC Samples | Brookfield viscosity, mPa.s |
|---|---|
| Blanose 7L | 575 |
| Example 3-a | 590 |
| Example 3-b | 550 |
| Example 3-c | 515 |

The trend is lower viscosity at increasing surfactant levels. This can be explained by the reduced amount of active CMC content at higher surfactant concentration.

While making the 5% solution for measuring the viscosity, the appearance of the solution regarding lump formation has been checked. Time required for full disaggregation of the lumps has been measured.

In Table 6, the disaggregation of the CMC samples was characterized by the presence of transparent gels as well as their size resulting from lump formation upon polymer addition. The data indicate that the dissolution of the non-treated Blanose 7L CMC produces many big lumps compared to a reduced amount and smaller lumps when using the surfactant treated samples of Examples 3-a to 3-c. The complete dissolution of the CMC samples, characterized by smooth and lump free solution, is achieved after 30 minutes mixing for the comparative example versus 20 minutes for the surfactant treated samples.

Performance of Examples 3-a to 3-c were evaluated in two different types of coating colors.

For the first series of coating colors, Blanose refined CMC concentrations were added as a 5% solution. This series of paper coatings was based on Hydrocarb 90/SPS, at a final solids content of 65%.

The basic formulation for the paper coating contains: a) 40 parts of $CACO_3$ slurry (Hydrocarb 90 containing about 75% solids, available from OMYA, Orgon, France; b) 60 parts of SPS China Clay Slurry (S.C. 65% kaolin, available from English China Clay International, Austell/Cornwal, England); c) 10 parts of Latex (DOW Latex 955, available from Dow Chemicals, Terneuzen, The Netherlands); d) 0.25 parts of Dispex N40 sodium acrylate copolymer dispersing agent (available from Allied Colloids, Bradford, England); and, e) 0.00, 0.25, 0.50, 0.75 and 1.00 part of Blanose 7L (surfactant treated and non-treated). The CMC concentration is based on dry solids in the 5% solution.

TABLE 7

Viscosity of Hydrocarb 90/SPS based coating color

| CMC concentration (dry) | RVT Brookfield viscosity, at 100 rpm & 25° C., mPa.s | | | | |
|---|---|---|---|---|---|
| | 0.00 parts | 0.25 parts | 0.50 parts | 0.75 parts | 1.00 part |
| Blanose 7L | 254 | 852 | 1450 | 1370 | 1820 |
| Example 3-a | 254 | 918 | 1400 | 1580 | 1760 |
| Example 3-b | 254 | 922 | 1420 | 1680 | 1840 |
| Example 3-c | 254 | 920 | 1390 | 1620 | 1820 |

In Table 7, the viscosity data are globally the same. However, we do observe a little advantage on the thickening efficiency with the sample treated with surfactant; mainly at 0.25 parts and 0.75 parts in the paper coating formulation.

TABLE 6

Dissolving time and lumping

| Mixing Time (min) | Presence of transparent gels | | | | Gels larger than, mm | | | | Gels smaller than, mm | | | |
|---|---|---|---|---|---|---|---|---|---|---|---|---|
| | Ref.[1] | Ex. 3-a | Ex. 3-b | Ex. 3-c | Ref.[1] | Ex. 3-a | Ex. 3-b | Ex. 3-c | Ref.[1] | Ex. 3-a | Ex. 3-b | Ex. 3-c |
| 0.5 | Yes | Yes | Yes | Yes | 15 | 8 | 7 | 7 | 5 | 4 | 4 | 3 |
| 1 | Yes | Yes | Yes | Yes | 10 | 8 | 7 | 7 | 5 | 4 | 4 | 3 |
| 2 | Yes | Yes | Yes | Yes | 10 | 8 | 7 | 7 | 5 | 4 | 4 | 3 |
| 3 | Yes | Yes | Yes | Yes | 10 | 8 | 7 | 5 | 5 | 4 | 4 | 3 |
| 4 | Yes | Yes | Yes | Yes | 10 | 6 | 7 | 5 | 3 | 4 | 4 | 3 |
| 5 | Yes | Yes | Yes | Yes | 10 | 6 | 5 | 5 | 3 | 4 | 3 | 3 |
| 10 | Yes | Yes | Yes | Yes | 5 | 6 | 5 | 5 | 3 | 3 | 3 | 3 |
| 15 | Yes | Yes | Yes | Yes | 8 | 6 | 4 | 5 | 3 | 4 | 3 | 3 |
| 20 | Yes | No | No | No | 8 | — | — | — | 3 | — | — | — |
| 30 | No | — | — | — | — | — | — | — | — | — | — | — |

[1]Blanose 7L

A second series of coating colors, based on DB plate, has been prepared to check the effect of incorporating the CMC as a powder instead of a solution in the coating color. The formulation was based on 65% solids content.

The basic formulation for these paper coatings contain: a) 100 parts of clay (DB plate, available from Dry Branch Kaolin Company, Georgia, USA); b) 10 parts of DOW Latex 955; c) 0.25 parts of Dispex N40; and d) 0.00 and 0.50 parts of Blanose refined CMC 7L (surfactant treated and nontreated).

TABLE 8

Viscosity of DB plate based coating color

| | RVT Brookfield viscosity, at 100 rpm & 25° C., mPa.s | | |
|---|---|---|---|
| CMC concentration (dry) | 0.00 parts | 0.50 parts as solution | 0.50 parts as powder |
| Blanose 7L | 216 | 916 | 852 |
| Example 3-a | 216 | 880 | 924 |
| Example 3-b | 216 | 872 | 856 |
| Example 3-c | 216 | 852 | 828 |

The data in Table 8 indicate that no significant differences (positive or negative) were observed by adding the CMC as powder or solution in the pigment slurry. The viscosity remains equivalent. More interesting is the effect when the CMC is added as solution; the final viscosity of the pigment is slightly lower with surfactant treated CMCs. Paper mills like to go as high as possible for their solution concentration. However, the viscosity of the concentrate restricted them to use low Mw CMC's, although higher Mw CMC's would do a better job. Since surfactants like POESMS result in lower viscosities, this will allow an increase in the solution concentration.

Performance in Oil Field Application

For oil field applications, regular (Hivis) and low viscosity (Lovis) premium grade PolyAnionic Cellulose (AquaPAC.Reg & LV) were treated with various types and concentrations of surfactant (Examples 1-a to 1-k and 2-a to 2-k). They were evaluated on the basis of their hydration/dissolution and performance in different types of aqueous media. Competitive dispersible high viscosity grade Polyanionic Cellulose (Hivis PAC) as well as Glyoxal treated AquaPAC® (REG and LV) polyanionic cellulose were used for comparative purposes.

The dispersibility of the polymers is characterized by high and rapid viscosity development illustrated by the dissolution time calculated from the hydration curves. The dissolution time is the time at which 90% of the viscosity is achieved.

The hydration curves were determined by slowly adding 1.5 g of high viscosity grade polyanionic cellulose samples or 4.5 g of low viscosity grade polyanionic cellulose samples into 200 ml of buffered demineralized water, over a 15–20 seconds time period, while running the viscometer at 250 rpm.

Due to low shear conditions generated by the Brabender viscometer, the nontreated material remains on the surface upon polymer addition resulting in a hydrated big lump with undetermined dissolution time. Under same conditions, the surfactant treated material goes into the water making a large number of small lumps, which disappear in a short time (small amount of material remains on the surface, mainly with lovis material because of the large amount needed to reach full Brabender viscosity scale). In other words, the dissolution time of the samples resulting from the disaggregation of the initial small lumps is measured (Tables 9 and 10).

TABLE 9

Dissolution time of high viscosity grade Polyanionic Cellulose

| | Dissolution time, minutes | | | Final Brabender viscosity, BU | | |
|---|---|---|---|---|---|---|
| | pH 5 | pH 7 | pH 9.5 | pH 5 | pH 7 | pH 9.5 |
| Standard AquaPAC.Reg | Und.* (B.L.) | Und.* (B.L.) | Und.* (B.L.) | 260 | 170 | 310 |
| Competitive Dispersible Hivis PAC | 20 | 16.5 | 17.5 | 860 | 800 | 600 |
| Glyoxalated AquaPAC.Reg | 45 | 37 | 35 | 940 | 900 | 920 |
| Example 1-a | 14.5 | 15 | 16 | 760 | 700 | 780 |
| Example 1-b | 9 | 10 | 12 | 720 | 760 | 780 |
| Example 1-c | 15.5 | 14.5 | 16 | 780 | 760 | 780 |
| Example 1-d | 12 | 15 | 12 | 710 | 780 | 760 |
| Example 1-e | 16.5 | 14 | 19.5 | 900 | 810 | 760 |
| Example 1-f | 12.5 | 12 | 13 | 820 | 780 | 680 |
| Example 1-g | 15 | 10.5 | 15.5 | 740 | 790 | 780 |
| Example 1-h | 7 | 6.5 | 9.5 | 680 | 710 | 640 |
| Example 1-i | 12 | 14.5 | 16 | 740 | 870 | 700 |
| Example 1-j | 19.5 | 20 | 22 | 730 | 620 | 690 |
| Example 1-k | 9 | 6.5 | 9 | 820 | 800 | 840 |

*Undetermined, Big Lump

TABLE 10

Dissolution time of low viscosity grade Polyanionic Cellulose

|  | Dissolution time, minutes | | | Final Brabender viscosity, BU | | |
| --- | --- | --- | --- | --- | --- | --- |
|  | pH 5 | pH 7 | pH 9.5 | pH 5 | pH 7 | pH 9.5 |
| Standard AquaPAC.LV | Und.* (B.L.) | Und.* (B.L.) | Und.* (B.L.) | 180 | 220 | 200 |
| Example 2-a | 16.5 | 16 | 17.5 | 760 | 700 | 860 |
| Example 2-b | 15 | 17 | 17 | 840 | 740 | 760 |
| Example 2-c | 18 | 20 | 19 | 750 | 790 | 680 |
| Example 2-d | 19 | 22 | 19 | 810 | 820 | 840 |
| Example 2-e | 25 | 24.5 | 24 | 710 | 720 | 740 |
| Example 2-f | 15 | 16 | 16 | 700 | 680 | 710 |
| Example 2-g | 14 | 15 | 19 | 550 | 530 | 580 |
| Example 2-h | 22 | 17 | 15 | 460 | 600 | 510 |
| Example 2-i | — | — | 21 | — | — | 850 |
| Example 2-j | 8 | 14 | 15.5 | — | 700 | 480 |
| Example 2-k | 7 | 17.5 | 17.5 | — | 740 | — |

*Undetermined, Big Lump

In Tables 9 and 10, initial lumping was observed on all samples. With the exception of the standard non-treated samples, most lumps had dispersed after 15 to 20 minutes. Also, the data indicate that regardless the pH polyethoxyethylene sorbitan monosteareate (polysorbate 60), at an amount of 0.25 wt. %, gives the optimum dissolution times (samples 1-b & 1-f and 2-b & 2-f). Samples 1-b and 1-f dissolve about 3.5 to 7 minutes faster than the high viscosity grade competitive dispersible PAC (Table 9). Under the same conditions, the glyoxalated AquaPAC.Reg polyanionic cellulose sample gives very good dispersion with no initial lump formation, longer time is however needed to achieve full dissolution (about 35 to 45 minutes depending on pH).

Additional testing was conducted under higher shear conditions to determine the dissolution speed of 1% solution of high viscosity grade PAC. The preparation was made using Bioblock agitators at 800 rpm. Then, the viscosity (LVT Brookfield, at 25° C., 30 rpm) was recorded at regular intervals. The viscosity recorded after 64 minutes mixing was considered as the final viscosity.

TABLE 11

Dissolution speed of high viscosity grade Polyanionic Cellulose

|  | Brookfield viscosity, mPa · s | | | | | |
| --- | --- | --- | --- | --- | --- | --- |
| Mixing time | 2 min | 4 min | 8 min | 16 min | 32 min | 64 min |
| Standard AquaPAC.Reg | 2920 | 3920 | 4380 | 4740 | 5260 | 5420 |
| Glyoxalated AquaPAC.Reg | 340 | 540 | 940 | 2640 | 5100 | 5980 |
| Competitive Dispersible PAC | 3000 | 4280 | 5480 | 5660 | 6140 | 6520 |
| Example 1-b | 4300 | 4640 | 5000 | 5300 | 5400 | 5440 |

In Table 11, we can observe that the surfactant treated AquaPAC.Reg of Example 1-b develops about 92% of its final viscosity after 8 minutes mixing against about 81%, 84% and 16% for standard AquaPAC.Reg Competitive Dispersible Hivis PAC and Glyoxalated AquaPAC.Reg respectively.

The compositions of Examples 1 (a–k) and 2 (a–k) were then evaluated for their performance in different drilling fluid systems. The evaluation was made on the basis of viscosity and fluid loss properties in clear fluids and bentonite based drilling muds of different salinity and pH conditions.

The viscosity yield was determined by carefully dissolving by means of a Hamilton Beach mixer: a) 0.80 ppb of Hivis PAC, or 1.6 ppb of Lovis PAC in fresh water; and, b) 1.43 ppb of Hivis, or 2.5 ppb of Lovis PAC in NaCl saturated water. The apparent viscosity was measured after 2 hours static aging at room temperature using Fann 35S viscometer as recommended by the American Petroleum Institute (A.P.I. R.P. 13B).

The filtration properties were determined in a bentonite/KCl mud containing: a) 10 ppb of hydrated wyoming bentonite; b) 11.25 ppb of KCl; c) 7.5 ppb of Sea salt; and d) 10.5 ppb of Rev-dust to simulate drilling cuttings; and; e) 0.75 ppb of polymer. To check the contribution of the dispersibility of the polymeric material, the polymer samples were added by sifting or dumping into the base suspension. pH of the mud was adjusted to 9.0–9.5. The fluid loss determination was made after static aging for overnight. Viscosity and fluid loss results are shown in Tables 12 and 13.

TABLE 12

Viscosity and fluid loss properties of high viscosity grade Polyanionic Cellulose

|  | Apparent Viscosity in Fresh Water (mPa · s) | | Apparent Viscosity in NaCl Satd. Water (mPa · s) | | Fluid Loss (ml) | |
| --- | --- | --- | --- | --- | --- | --- |
|  | Sifted | Dumped | Sifted | Dumped | Sifted | Dumped |
| Standard AquaPAc.Reg | 18.5 | 14 | 35 | 25.5 | 13.5 | 15.1 |
| Competitive Disp. Hivis PAC | 18.25 | 18 | 28.5 | 27.5 | 16.8 | 16.7 |
| Glyoxalated AquaPAC.Reg | 18 | 17 | 7 | 5.5 | 14.4 | 14.3 |
| Example 1-a | 18.25 | 18.5 | 32.5 | 32 | 13.9 | 13.5 |
| Example 1-b | 19 | 17 | 34.5 | 33.5 | 13.2 | 13 |
| Example 1-c | 18.75 | 17.5 | 34 | 34 | 14 | 14.7 |
| Example 1-d | 18.5 | 18.5 | 33 | 34 | 13.4 | 13.8 |
| Example 1-e | — | — | — | — | — | — |
| Example 1-f | 17.25 | 17.25 | 34.5 | 34 | 14.2 | 14.4 |
| Example 1-g | 18 | 18 | 33 | 32.5 | 13.1 | 12.7 |
| Example 1-h | 17.25 | 17.25 | 29 | 27.5 | 16.8 | 16.7 |

TABLE 12-continued

Viscosity and fluid loss properties of high viscosity grade Polyanionic Cellulose

|  | Apparent Viscosity in Fresh Water (mPa · s) | | Apparent Viscosity in NaCl Satd. Water (mPa · s) | | Fluid Loss (ml) | |
|---|---|---|---|---|---|---|
|  | Sifted | Dumped | Sifted | Dumped | Sifted | Dumped |
| Example 1-i | — | — | — | — | — | — |
| Example 1-j | 17.5 | 17.5 | 30 | 29.25 | 14.1 | 13.2 |
| Example 1-k | 17.75 | 16.5 | 30.75 | 30 | 14.3 | 13.9 |

TABLE 13

Viscosity and fluid loss properties low viscosity grade Polyanionic Cellulose

|  | Apparent Viscosity in Fresh Water (mPa · s) | | Apparent Viscosity in NaCl Satd. Water (mPa · s) | | Fluid Loss (ml) | |
|---|---|---|---|---|---|---|
|  | Sifted | Dumped | Sifted | Dumped | Sifted | Dumped |
| Standard AquaPAC.LV | 13.25 | 11 | 23.5 | 17.5 | 25.7 | 27.8 |
| Example 2-a | 12.5 | 13 | 23 | 23.5 | 23.8 | 24.1 |
| Example 2-b | 13.25 | 12.75 | 23 | 21.5 | 24.2 | 24.3 |
| Example 2-c | 13.5 | 14 | 24 | 23.5 | 23.9 | 24.7 |
| Example 2-d | 13.5 | 13.5 | 23.5 | 23.75 | 24.3 | 24.6 |
| Example 2-e | 12.5 | 12.5 | 22.25 | 22 | 24.3 | 25.1 |
| Example 2-f | 12.75 | 12.75 | 23.75 | 22.5 | 23.9 | 23.6 |
| Example 2-g | 12.75 | 12 | 22.5 | 20 | 25 | 24.9 |
| Example 2-h | 12.5 | 12 | 22.5 | 19.25 | 25.1 | 25.1 |
| Example 2-i | 12.5 | 12.25 | 22.5 | 21.5 | 24.9 | 25.7 |
| Example 2-j | 11.75 | 11.75 | 21.5 | 19 | 25 | 26.2 |
| Example 2-k | 12 | 11.75 | 21.25 | 20 | 23.9 | 25.6 |

Data in Tables 12 and 13 indicate that regardless of the way the polymeric material is added, and contrary to the standard nontreated samples, almost no significant differences were observed with samples treated with surfactant. In comparison with the competitive dispersible Hivis PAC, the resulting treated AquaPAC samples show a clear superiority for both viscosity and filtration properties.

In addition, the possible impact of pH on the efficiency of the surfactant treatment has been investigated. For that purpose, the viscosity properties were measured in three buffered systems. The polymeric material was added carefully by sifting it into the aqueous media. Contrary to the glyoxalated AquaPAC.Reg and to certain extent the competitive dispersible Hivis PAC in saturated salt water, data in Tables 14 & 15 clearly show that regardless the pH of the systems the viscosity properties remain identical.

TABLE 14

Apparent Viscosity of high viscosity grade Polyanionic Cellulose vs. pH

|  | Apparent Viscosity in Fresh water, mPa · s | | | Apparent Viscosity in saturated salt water, mPa · s | | |
|---|---|---|---|---|---|---|
|  | pH 7 | pH 9 | pH 11 | pH 7 | pH 9 | pH 11 |
| Standard AquaPAC.Reg | 18.25 | 18 | 18 | 33.5 | 32.75 | 32.25 |
| Competitive Disp. Hivis PAC | 17 | 17.25 | 17 | 26.5 | 29 | 28.5 |
| Glyoxalated AquaPAC.Reg | 17 | 17.5 | 17.5 | 7.5 | 12 | 31 |
| Example 1-a | 18.25 | 18.5 | 17 | 32.5 | 31.5 | 32 |
| Example 1-b | 18 | 18 | 18 | 32.5 | 32.75 | 32.75 |
| Example 1-c | 18.5 | 18.5 | 17.5 | 34 | 33.5 | 33 |
| Example 1-d | 18.5 | 18.5 | 17.5 | 33 | 33 | 33.5 |
| Example 1-e | — | — | — | — | — | — |
| Example 1-f | 18.5 | 18.75 | 18 | 34.5 | 35 | 33.5 |
| Example 1-g | 18 | 18 | 16.5 | 33 | 32.75 | 32 |
| Example 1-h | 17 | 17.25 | 17 | 29.5 | 28.5 | 28 |
| Example 1-i | — | — | — | — | — | — |
| Example 1-j | 17.5 | 17.5 | 17 | 30 | 29 | 29 |
| Example 1-k | 17.5 | 17.25 | 16.75 | 31 | 29.75 | 29.5 |

TABLE 15

Apparent Viscosity of low viscosity grade Polyanionic Cellulose vs. pH

|  | Apparent Viscosity in Fresh water, mPa · s | | | Apparent Viscosity in saturated salt water, mPa · s | | |
|---|---|---|---|---|---|---|
|  | pH 7 | pH 9 | pH 11 | pH 7 | pH 9 | pH 11 |
| Standard AquaPAC.LV | 12.5 | 12.5 | 12.5 | 23.25 | 23.25 | 23.25 |
| Example 2-a | 12.75 | 12.75 | 13.25 | 22.75 | 23.25 | 22.5 |
| Example 2-b | 13 | 13 | 13 | 23.25 | 23 | 23.25 |
| Example 2-c | 14 | 14 | 13.5 | 24 | 24 | 23.5 |
| Example 2-d | 13.25 | 12.5 | 12.5 | 23.5 | 23.5 | 23.5 |
| Example 2-e | 12.5 | 13 | 12.5 | 22.75 | 23 | 22 |
| Example 2-f | 12.75 | 12.75 | 12 | 23.5 | 23.25 | 22.75 |
| Example 2-g | 12.5 | 12.5 | 12 | 22.5 | 22.5 | 22 |
| Example 2-h | 12.5 | 12.5 | 12 | 22.5 | 22.75 | 22.25 |
| Example 2-i | 12.5 | 12.5 | 11.75 | 22.5 | 22.5 | 22.5 |
| Example 2-j | 12 | 12 | 11 | 21.5 | 21.75 | 21.5 |
| Example 2-k | 12 | 12 | 11 | 21.5 | 21.5 | 20.75 |

The impact of salinity on the effect of the surfactant treatment was investigated in saturated NaCl mud containing: a) 10 ppb of pre-hydrated wyoming bentonite; b) 125 ppb of NaCl; c) 10 ppb of Rev-dust; and, d) 1 ppb of Hivis PAC, or 2 ppb of Lovis PAC. The polymers were added by sifting and dumping into the suspension. pH was adjusted to 9.0–9.5. The viscosity and filtration properties were measured after two hours static aging.

TABLE 16

Viscosity and filtration properties of Hivis PAC in saturated NaCl mud

|  | Apparent Viscosity, mPa.s | | Fluid Loss, ml | |
|---|---|---|---|---|
|  | Sifted | Dumped | Sifted | Dumped |
| Standard AquaPAC.Reg | 18 | 6.5 | 11.8 | 73.9 |
| Competitive Disp. Hivis PAC | 15.5 | 14.5 | 17.6 | 18.4 |
| Glyoxalated AquaPAC.Reg | 17 | 15 | 12.1 | 13.3 |
| Example 1-a | 19.25 | 18.5 | 11.4 | 11.3 |
| Example 1-b | 17.75 | 14.75 | 11.8 | 13.2 |
| Example 1-c | 17.75 | 18 | 12.5 | 12.4 |
| Example 1-d | 18 | 17.5 | 12.2 | 11.9 |
| Example 1-e | — | — | — | — |

TABLE 16-continued

Viscosity and filtration properties of Hivis PAC in saturated NaCl mud

| | Apparent Viscosity, mPa.s | | Fluid Loss, ml | |
|---|---|---|---|---|
| | Sifted | Dumped | Sifted | Dumped |
| Example 1-f | 16.5 | 17.75 | 9.8 | 12.6 |
| Example 1-g | 16 | 9.5 | 11.5 | 26.2 |
| Example 1-h | 16.5 | 11.5 | 11.8 | 19.2 |
| Example 1-i | — | — | — | — |
| Example 1-j | 16.5 | 15 | 10.6 | 13.1 |
| Example 1-k | 17.5 | 13 | 11 | 15.5 |

TABLE 17

Viscosity and filtration properties of Lovis PAC in saturated NaCl mud

| | Apparent Viscosity, mPa.s | | Fluid Loss, ml | |
|---|---|---|---|---|
| | Sifted | Dumped | Sifted | Dumped |
| Standard AquaPAC.LV | 14 | 9.75 | 7.5 | 13.8 |
| Example 2-a | 15 | 15.5 | 8.4 | 7.9 |
| Example 2-b | 14.25 | 12.25 | 7.3 | 10 |
| Example 2-c | 14.75 | 14.75 | 8.3 | 8 |
| Example 2-d | 14.75 | 14.75 | 7.9 | 7.9 |

TABLE 17-continued

Viscosity and filtration properties of Lovis PAC in saturated NaCl mud

| | Apparent Viscosity, mPa.s | | Fluid Loss, ml | |
|---|---|---|---|---|
| | Sifted | Dumped | Sifted | Dumped |
| Example 2-e | 14 | 11 | 7.1 | 9.6 |
| Example 2-f | 12.5 | 12 | 7.5 | 8.1 |
| Example 2-g | 13.5 | 13.25 | 7.1 | 6.9 |
| Example 2-h | 14 | 12.5 | 6.8 | 7.9 |
| Example 2-i | 13.25 | 10.75 | 7.6 | 9.8 |
| Example 2-j | 12.5 | 11.75 | 8.3 | 8.8 |
| Example 2-k | 12.5 | 11.5 | 7.7 | 8.4 |

In this mud system, the addition of the polymer by dumping it into the suspension resulted in severe lumping using the standard non-treated material. In comparison to the sifted procedure in Tables 16 & 17, dumping polymer resulted in low apparent viscosity and extremely high fluid loss. Again in this case, the efficiency of the surfactant treatment to improve the dispersibility of the polymers can easily be noted; the data when sifting or dumping the polymers remain similar.

Performance in Paint Application

Blanose refined CMCs 7M and 9H4 of Examples 3-d to 3-g were evaluated in standard high PVC-paint (PVC 90%) for interior application where CMC is normally used as a thickener. The paint formulation contains: a) 290.5 g of water; b) 1.5 g of preservative (Mergol K6N, available from Riedel de Hoën AG, Seelze, Germany); c) 1.0 g of wetting agent (Calgon N, available from Benckiser Knapsack, GmbH, ladenburg, Germany); d) 2 g of surfactant (Synperonic NP 10, available from ICI Chemicals & Polymers Ltd., Middlesbrough, England); e) 1.0 g of defoamer, (Agilan 280, available from Münzing Chemie GmbH, Heilbtonn, Germany) f) 80 g of $TiO_2$; g) 580 g of $CaCO_3$; h) 58 g of Latex, (Acronal 290 D, available from FASF AG, Lüdwigshaven, Germany); and, i) 134 g of thickener & water (for viscosity adjustment, in addition to the original water content) pH of the paint was 8.8 pH of the paint was 8.8. The corresponding nontreated CMCs were used as reference for comparison.

Characteristics investigated were: a) ease of incorporation into the paint; b) thickening efficiency; c) water sensitivity; and, d) storage stability of the resulting paint.

TABLE 18

Rheology and stability properties in high PVC (90%) paint

| | Blanose 7M | Ex. 3-d | Ex. 3-e | Std Blanose 9H4 | Ex. 3-f | Ex. 3-g |
|---|---|---|---|---|---|---|
| Low shear stormer visco, KU[1] | 104 | 112 | 103 | 108 | 100 | 99 |
| After 24 hours aging | | | | | | |
| High shear ICI visco, mPa · s[2] | 200 | 195 | 175 | 140 | 130 | 120 |
| Thickening efficiency, %[3] | 1.00 | 1.06 | 1.06 | 0.58 | 0.62 | 0.62 |
| 1 month storage stability | | | | | | |
| Stormer yield value, g[4] | 150 | 700 | 700 | 50 | 200 | 200 |
| Stormer viscosity, KU | 99 | 124 | 113 | 106 | 99 | 97 |
| Surface Supernatant, % | 3 | No | No | 1 | No | No |

[1]Low shear Krebs Stormer viscosity measured in Krebs Units (KU) according to ASTM D-562 method.
[2]High shear ICl viscosity measured in mPa · s according to ASTM D-4287 method.
[3]Amount of thickener used to achieve low shear stormer viscosity of 100 Krebs Units.
[4]Weight required to break the gel structure and initiate the flow.

During the preparation of the paint recipe, the following were observed: a) ease of incorporation of the treated Blanose CMC samples of compositions 3-d to 3-g into the aqueous phase; and, b) better and quicker dissolution without lump formation compared to standard nontreated Blanose CMC samples.

The data of Table 18 illustrate the good performance of the surfactant treated Blanose refined CMCs 7M and 9H4 in paint application. Despite a reduction of thickening efficiency by about 6% and 7% observed with surfactant treated Blanose refined CMCs 7M and 9H4 respectively, significant improvement of the paint stability were observed with the treated samples. In fact, no supernatant was observed after 1-month storage at 25° C. contrary to the results with the nontreated samples. Also, polyoxyethylene sorbitan monostereate had no impact on water sensitivity of the paint.

Accordingly, the surfactant treatment of the present invention could be useful for other applications as well, like pharmaceutical preparations, cosmetics and personal care, toothpaste, (liquids, gels or creams), food (frozen diary products, pet food, bakery products, beverages, low calorie foods, salad dressing), superabsorbent & hygiene products, drilling fluids (oil field and civil engineering applications), paint, household products, water based adhesive systems, welding rods, textile sizing, paper & paper products, (paint emulsion & suspension polymerization).

What is claimed is:

1. A composition consisting essentially of (a) at least one cellulose ether selected from the group consisting of carboxymethyl cellulose, methyl cellulose, hydroxyethyl cellulose, carboxymethyl hydroxyethyl cellulose, ethyl hydroxyethyl cellulose, methylhydroxyethyl cellulose, hydroxypropyl cellulose and methylhydroxypropyl cellulose and (b) at least one surfactant selected from the group consisting of polyoxyethylene sorbitan monostearates, wherein the cellulose ether is present in an amount of from about 98% to about 99.9%, the surfactant is present in an amount of from about 0.1% to about 2%, and the particle size distribution of the composition is such that about 95% of the particles have a size less than about 425 microns.

2. The composition of claim 1 wherein the cellulose ether is selected from the group consisting of carboxymethyl cellulose, methyl cellulose, hydroxyethyl cellulose and carboxymethyl hydroxyethyl cellulose.

3. The composition of claim 2 wherein the surfactant is selected from the group consisting of polyethoxyethylene sorbitan esters, the water soluble polymer is present in an amount of from about 99% to about 99.85%, and the surfactant is present in an amount of from about 0.15% to about 1%, and the particle size distribution is such that the particles have a size greater than about 150 microns and less than about 425 microns.

4. The composition of claim 1 wherein the particle size distribution is such that the particles have a size greater than about 150 microns and less than about 425 microns.

5. The composition of claim 1 wherein the amount of water soluble polymer is at least about 99.5%.

6. The composition of claim 1 wherein the amount of water soluble polymer is up to about 99.8%.

7. The composition of claim 1 wherein the amount of surfactant is at least about 0.2%.

8. The composition of claim 1 wherein the amount of surfactant is up to about 0.5%.

* * * * *